(12) United States Patent
Fujimoto

(10) Patent No.: US 8,243,421 B2
(45) Date of Patent: Aug. 14, 2012

(54) ELECTROLYTIC CAPACITOR AND METHOD OF MANUFACTURING THE SAME

(75) Inventor: Kazumasa Fujimoto, Saga (JP)

(73) Assignees: SANYO Electric Co., Ltd., Moriguchi-shi (JP); SAGA SANYO Industries Co., Ltd., Saga (JP)

( * ) Notice: Subject to any disclaimer, the term of this patent is extended or adjusted under 35 U.S.C. 154(b) by 620 days.

(21) Appl. No.: 12/364,886

(22) Filed: Feb. 3, 2009

(65) Prior Publication Data

US 2009/0195965 A1 Aug. 6, 2009

(30) Foreign Application Priority Data

Feb. 6, 2008 (JP) ................... 2008-026493

(51) Int. Cl.
*H01G 4/32* (2006.01)
*H01G 9/02* (2006.01)
*H01G 9/10* (2006.01)

(52) U.S. Cl. ........ 361/511; 361/512; 361/518; 361/519; 361/520

(58) Field of Classification Search .................. 361/517, 361/518, 519, 535, 536, 537, 530, 539, 511, 361/512

See application file for complete search history.

(56) References Cited

U.S. PATENT DOCUMENTS

| | | | |
|---|---|---|---|
| 3,988,650 A * | 10/1976 | Fritze | 361/511 |
| 6,064,563 A * | 5/2000 | Yamada et al. | 361/521 |
| 6,343,004 B1 | 1/2002 | Kuranuki et al. | |
| 2004/0100756 A1 | 5/2004 | Koizumi et al. | |
| 2004/0201949 A1 | 10/2004 | Kida et al. | |

FOREIGN PATENT DOCUMENTS

| | | |
|---|---|---|
| CN | 1971785 A | 5/2007 |
| JP | 63-65212 U | 4/1988 |
| JP | 8-153654 A | 6/1996 |
| JP | 11-121303 A | 4/1999 |
| JP | 11-265839 A | 9/1999 |

(Continued)

OTHER PUBLICATIONS

Korean Office Action dated Oct. 20, 2010, issued in corresponding Korean Patent Application No. 10-2008-0111559.

(Continued)

*Primary Examiner* — Jayprakash N Gandhi
*Assistant Examiner* — Arun Ramaswamy
(74) *Attorney, Agent, or Firm* — Westerman, Hattori, Daniels & Adrian, LLP

(57) ABSTRACT

An electrolytic capacitor in which positions of an anode terminal and a cathode terminal in a wound-type capacitor element can be fixed and consequently increase in leakage current can be suppressed and a manufacturing method thereof are provided. The electrolytic capacitor including a wound-type capacitor element having an anode terminal and a cathode terminal, a bottomed case accommodating the wound-type capacitor element, and a sealing member sealing the winding structure portion in the bottomed case, through which the anode terminal and the cathode terminal penetrate, includes a fixing member arranged between the winding structure portion and the sealing member and having openings in number not smaller than the sum of the number of anode terminals and the number of cathode terminals, the anode terminal and the cathode terminal passing through the openings, and the anode terminal and the cathode terminal being fixed by the fixing member.

8 Claims, 2 Drawing Sheets

FOREIGN PATENT DOCUMENTS

| | | |
|---|---|---|
| JP | 2000-114118 A | 4/2000 |
| JP | 2003-217979 A | 7/2003 |
| JP | 2004-179621 A | 6/2004 |
| JP | 2005-057105 A | 3/2005 |
| JP | 2007-173773 A | 7/2007 |
| KR | 2000-0017568 A | 3/2000 |
| KR | 2004-0089494 A | 10/2004 |

OTHER PUBLICATIONS

Chinese Office Action dated Aug. 12, 2011, issued in corresponding Chinese Patent No. 200910003732.5.

Japanese Office Action dated Mar. 13, 2012, issued in corresponding Japanese Patent Application No. 2008-026493.

* cited by examiner

ELECTROLYTIC CAPACITOR AND METHOD OF MANUFACTURING THE SAME

BACKGROUND OF THE INVENTION

1. Field of the Invention

The present invention relates to an electrolytic capacitor and a method of manufacturing an electrolytic capacitor.

2. Description of the Background Art

In recent years, an electric circuit has been required to have a smaller size and to adapt to high frequency, and accordingly, a capacitor is also required to have low impedance or the like. Then, an electrolytic capacitor including TCNQ complex salt or a conductive polymer such as polypyrrole, polythiophene, polyfuran, and polyaniline as a solid electrolyte of the capacitor has attracted attention.

FIG. 3 is a perspective view schematically showing a wound-type capacitor element in a conventional electrolytic capacitor. FIG. 4 is a cross-sectional view of the conventional electrolytic capacitor. A structure or the like of the conventional electrolytic capacitor is disclosed, for example, in Japanese Patent Laying-Open No. 2003-217979. A method of manufacturing the conventional wound-type electrolytic capacitor including a solid electrolyte will be described with reference to FIGS. 3 and 4.

Initially, an anode foil 22 subjected to etching process, chemical conversion treatment and the like by using a known method is prepared. Then, an anode lead 27 is attached to anode foil 22 through a lead tab terminal 26. Thereafter, a cathode lead 28 is attached to a cathode foil 23 through lead tab terminal 26. Then, an anode foil 22 and cathode foil 23 are wound up with a sheet of separator paper 24 being interposed therebetween and taped with a stop tape 25. Through the steps above, a wound-type capacitor element including a winding structure portion 21 formed of a wound-type layered structure and an anode terminal consisting of lead tab terminal 26 and anode lead 27 and a cathode terminal consisting of lead tab terminal 26 and cathode lead 28 is formed.

Thereafter, winding structure portion 21 is subjected to chemical conversion treatment of a cut section and heat treatment at a temperature from 150° C. to 300° C. Then, winding structure portion 21 is impregnated with a solution mixture of a monomer forming a conductive polymer through polymerization and an oxidizing agent solution such as a ferric p-toluenesulfonate alcohol solution. Thereafter, through thermochemical polymerization, a conductive polymer layer serving as a solid electrolyte can be formed between anode foil 22 and cathode foil 23 of winding structure portion 21.

Then, the wound-type capacitor element including the solid electrolyte is accommodated in a bottomed case 29 made of aluminum. Then, a sealing member 30 for sealing winding structure portion 21 within bottomed case 29 is placed in an opening of bottomed case 29. Thereafter, the wound-type capacitor is sealed by performing pressing in a lateral direction and curling in the opening of bottomed case 29, and aging treatment is performed.

Finally, a seat plate 31 made of plastic is provided on a curled surface around the opening of bottomed case 29 and anode lead 27 and cathode lead 28 are pressed and bent as electrode terminals 32, to complete the electrolytic capacitor.

Thermal stress, however, is applied to the wound-type electrolytic capacitor element during heat treatment or the like in the process of manufacturing such an electrolytic capacitor, and consequently, lower density of separator paper 24 is caused. In addition, mechanical stress is applied to the wound-type electrolytic capacitor element in such treatment as solid electrolyte filling in the manufacturing process, and consequently the electrolytic capacitor element may expand or deform. Then, positions of the anode terminal and the cathode terminal of the wound-type electrolytic capacitor element may be displaced from a desired position due to thermal stress and mechanical stress.

Moreover, in assembling the electrolytic capacitor, if sealing member 30 is forcibly placed after the wound-type capacitor element is accommodated in bottomed case 29, positions of the anode terminal and the cathode terminal may be displaced. In particular, if the sum of the number of anode terminals and the number of cathode terminals is not smaller than three, slight displacement of the anode terminal and the cathode terminal hinders placement of the sealing member of the electrolytic capacitor. Then, stress is applied to the anode foil and the cathode foil, which may result in increase in a leakage current or the like.

SUMMARY OF THE INVENTION

The present invention was made to solve the above-described problems. According to one aspect of the present invention, an electrolytic capacitor in which positions of an anode terminal and a cathode terminal in a wound-type capacitor element can be fixed and consequently increase in a leakage current can be suppressed as well as a method of manufacturing the same are provided.

The present invention relates to an electrolytic capacitor including a wound-type capacitor element having a winding structure portion formed by winding an anode foil and a cathode foil with a separator being interposed therebetween and an anode terminal and a cathode terminal drawn from the winding structure portion, a bottomed case accommodating the wound-type capacitor element, and a sealing member sealing the winding structure portion in the bottomed case, through which the anode terminal and the cathode terminal penetrate, that includes a fixing member arranged between the winding structure portion and the sealing member and having openings in number not smaller than a sum of the number of anode terminals and the number of cathode terminals, the anode terminal and the cathode terminal passing through the openings, and the anode terminal and the cathode terminal being fixed by the fixing member.

In addition, in the electrolytic capacitor according to the present invention, preferably, the sum of the number of the anode terminals and the number of the cathode terminals is three or greater.

In addition, in the electrolytic capacitor according to the present invention, preferably, the fixing member is made of an insulating material.

In addition, in the electrolytic capacitor according to the present invention, preferably, the insulating material is made of at least one selected from rubber, resin, fiber, and glass.

In addition, in the electrolytic capacitor according to the present invention, preferably, the fixing member has a thickness of 50% to 95% of a distance between an upper surface of the winding structure portion and a lower surface of the sealing member.

In addition, the present invention relates to a method of manufacturing an electrolytic capacitor including: a first step of forming a wound-type capacitor element including a winding structure portion formed by winding an anode foil and a cathode foil with a separator being interposed therebetween and an anode terminal and a cathode terminal drawn from the winding structure portion; and a second step of inserting the anode terminal and the cathode terminal in openings in a fixing member, the fixing member having openings in number not smaller than a sum of the number of the anode terminals and the number of the cathode terminals.

It is assumed herein that a direction toward the bottom of the bottomed case in a direction of thickness is defined as downward and a direction opposite thereto is defined as upward. Therefore, the upper surface herein refers to a surface upper in a direction of thickness and the lower surface refers to a surface lower in the direction of thickness.

According to the present invention, an electrolytic capacitor in which positions of an anode terminal and a cathode terminal in a wound-type capacitor element can be fixed and consequently increase in a leakage current can be suppressed can be obtained. In addition, in a method of manufacturing the same, stress such as friction in placing a sealing member is mitigated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
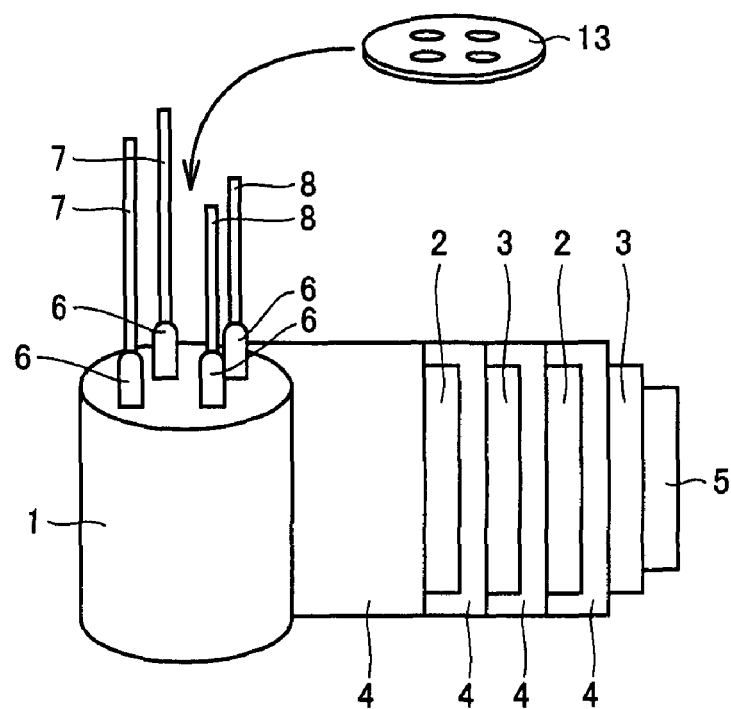
FIG. 1 is a perspective view schematically showing a wound-type capacitor element in an electrolytic capacitor in one embodiment of the present invention.

An embodiment of the present invention will be described hereinafter with reference to the drawings. In the drawings below, the same or corresponding elements have the same reference characters allotted and detailed description thereof will not be repeated. In addition, dimensions such as length, size and width in the drawings are modified as appropriate for clarity and simplification of the drawings, and actual dimensional relations are not shown.

Figure 2:
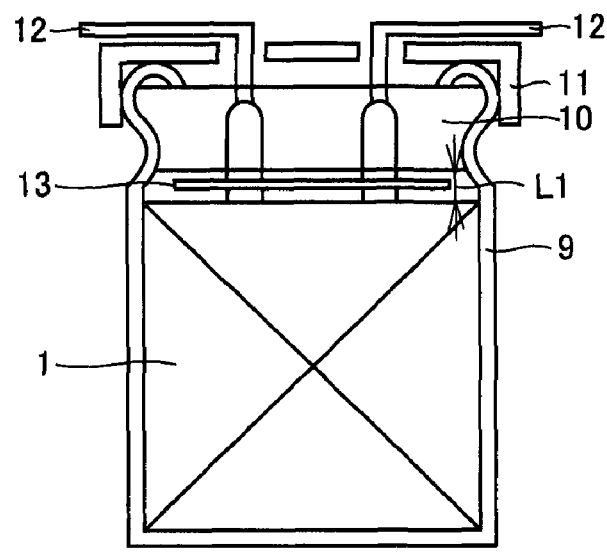
FIG. 2 is a cross-sectional view of the electrolytic capacitor in one embodiment of the present invention.
Figure 3:
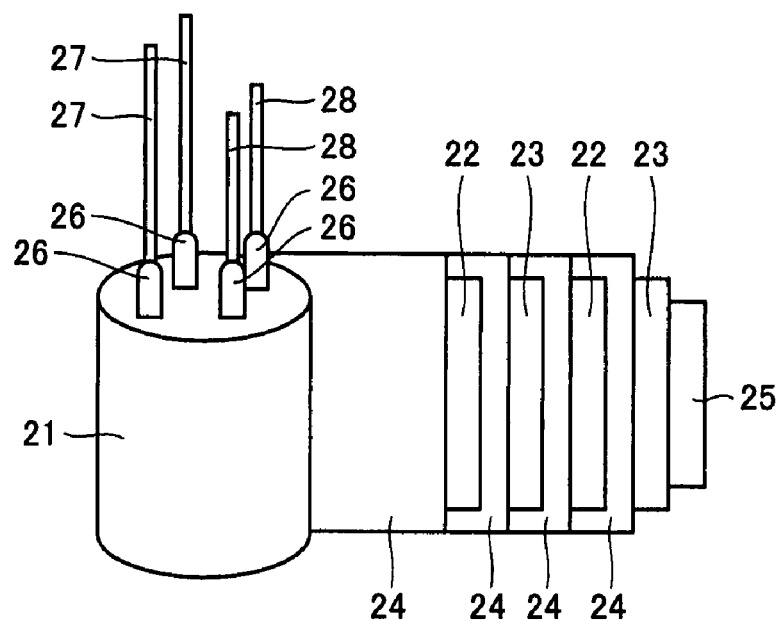
FIG. 3 is a perspective view schematically showing a wound-type capacitor element in a conventional electrolytic capacitor.
Figure 4:
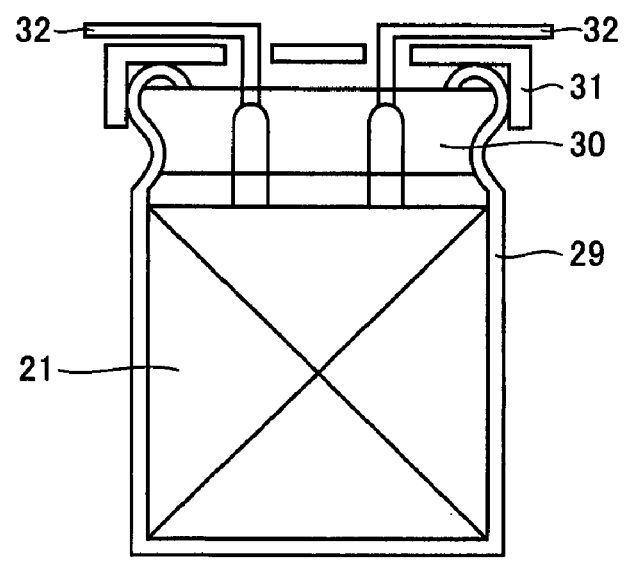
FIG. 4 is a cross-sectional view of the conventional electrolytic capacitor.

Description will be given hereinafter with reference to FIGS. 1 and 2. Initially, a wound-type capacitor element will be described with reference to FIG. 1.

<Structure of Electrolytic Capacitor>

The wound-type capacitor element in the present embodiment has a winding structure portion 1 formed by winding two anode foils 2 and one cathode foil 3 in a cylindrical shape with two sheets of separator paper 4 being interposed therebetween respectively. A lead tab terminal 6 is electrically connected to each of anode foils 2 and cathode foil 3. Here, one lead tab terminal 6 is connected to each of two anode foils 2, and two lead tab terminals 6 are connected to one cathode foil 3. Lead tab terminal 6 connected to anode foil 2 is electrically connected to an anode lead 7, and lead tab terminals 6 connected to cathode foil 3 are electrically connected to a cathode lead 8. Here, in the wound-type capacitor element in the present invention, the number of anode foils 2 and cathode foils 3 is not limited. For example, the number of anode foils 2 may be equal to or different from the number of cathode foils 3. It is noted that a dimension such as a thickness of anode foil 2, cathode foil 3 and separator paper 4 may be selected as appropriate.

An anode terminal is formed by lead tab terminal 6 and anode lead 7, and a cathode terminal is formed by lead tab terminal 6 and cathode lead 8. The wound-type capacitor element includes winding structure portion 1, the cathode terminal, and the anode terminal, and further includes, for example, a solid electrolyte as an electrolyte. In addition, in the present embodiment, the sum of the number of anode terminals and the number of cathode terminals is preferably three or greater. It is noted that a single lead tab terminal 6 or a plurality of lead tab terminals 6 may be connected to a single anode foil 2 or a single cathode foil 3.

In the electrolytic capacitor in the present embodiment, the wound-type capacitor element is accommodated in a bottomed case 9 formed from aluminum or the like, and the electrolytic capacitor includes a sealing member 10 sealing winding structure portion 1 in bottomed case 9, through which the anode terminal and the cathode terminal penetrate. In addition, in the present embodiment shown in FIG. 2, the electrolytic capacitor further includes a seat plate 11, however, absence of seat plate 11 does not give rise to a problem in the present invention.

Here, the electrolytic capacitor in the present embodiment includes a fixing member 13 arranged between winding structure portion 1 and sealing member 10 and having openings in number equal to or greater than the sum of the number of anode terminals and the number of cathode terminals. Fixing member 13 is placed between an upper surface of winding structure portion 1 and a lower surface of sealing member 10 (that is, at any position within a range of a distance L1 which will be described later), the anode terminal and the cathode terminal pass through the openings in fixing member 13, and the anode terminal and the cathode terminal are fixed by fixing member 13.

According to the electrolytic capacitor in the present embodiment, as the positions of the anode terminal and the cathode terminal in the wound-type capacitor element can be fixed, displacement of the position caused by thermal stress and mechanical stress in the manufacturing process is less likely. Therefore, defective products or the like caused by failure to place (insert) sealing member 10 in bottomed case 9 due to displacement can be mitigated. In addition, as the electrolytic capacitor in the present embodiment can suppress increase in the leakage current in the electrolytic capacitor that is caused by displacement of the position, performance thereof is higher than that of the conventional electrolytic capacitor. In the electrolytic capacitor in which the sum of the number of anode terminals and the number of cathode terminals is three or greater, slight displacement of the anode terminal and the cathode terminal particularly hinders placement of the sealing member of the electrolytic capacitor. Therefore, in the electrolytic capacitor according to the present invention, when the sum of the number of anode terminals and the number of cathode terminals is three or greater, the positions of the anode terminal and the cathode terminal are fixed by fixing member 13, to thereby particularly contribute to suppression of increase in the leakage current as compared with the conventional electrolytic capacitor.

<<Structure of Fixing Member>>

Fixing member 13 in the present embodiment is shaped like a button, and includes openings in number equal to the sum of the number of anode terminals and the number of cathode terminals. In the fixing member, the openings are provided at preferred positions of the anode terminal and the cathode terminal when the electrolytic capacitor is viewed from above. The preferred positions of the anode terminal and the cathode terminal in the electrolytic capacitor can be set as appropriate depending on the electrolytic capacitor, and the positions of the openings in fixing member 13 can also be set based on such preferred positions. In addition, the number of openings is preferably equal to or greater than the sum of the number of anode terminals and the number of cathode terminals. This is because, in a case of an electrolytic capacitor having fixing member 13 provided with openings in number greater than the number of openings for fixing the anode terminals and the cathode terminals, resistance of the electrolytic capacitor can further be low. Further, in impregnating the wound-type capacitor element including fixing member 13 provided with openings in number greater than the number of openings for fixing the anode terminals and the cathode terminals with a polymerization liquid (which will be described later), the wound-type capacitor element is impregnated from below. Therefore, as a path through which air flows is formed in a direction of thickness in fixing member 13 provided with a large number of openings, impregnation can be performed smoothly.

In the present embodiment, the opening in the present embodiment preferably has a diameter in a ±15% range of a width of lead tab terminal 6 of the anode terminal and the cathode terminal. This is because the diameter of the opening should be small enough to be able to fix the position of lead tab terminal 6. If fixing member 13 is made of a material having contractive property, the diameter of the opening is particularly preferably equal to, or in a −15% range of, a width of lead tab terminal 6. The opening is annular in the present embodiment, however, the shape of the opening is not particularly limited and for example, it may be oval, quadrangular or in other shapes.

In addition, the thickness of fixing member 13 is preferably 50% to 95% of distance L1 between the upper surface of winding structure portion 1 and the lower surface of sealing member 10. Here, as described above, fixing member 13 is placed between the upper surface of winding structure portion 1 and the lower surface of sealing member 10. If the thickness of fixing member 13 is smaller than 50% of distance L1, it may be difficult to fix the positions of the anode terminal and the cathode terminal. Alternatively, if the thickness of fixing member 13 exceeds 95% of distance L1, for example, in pressing in a lateral direction in an opening portion of bottomed case 9 in a process of manufacturing the electrolytic capacitor, clearance does not exist, and consequently, the possibility of short-circuiting or the like in the electrolytic capacitor, that is, a product, may be caused.

<Material for Each Member of Electrolytic Capacitor>

Exemplary materials for the electrolytic capacitor in the present embodiment are as follows.

<<Material for Fixing Member>>

Initially, in the present embodiment, the material for fixing member 13 is made of an insulating material, and specifically, the material is preferably made of at least one selected from rubber, resin, fiber, and glass. This is because, if fixing member 13 is made of an insulating material, there is no possibility of short-circuiting originating from fixing member 13 in the electrolytic capacitor. In the present embodiment, examples of the rubber include fluorine-based rubber, silicon-based rubber and butyl-based rubber, EPT (ethylene-propylene rubber), CSM (chlorosulfonated polyethylene rubber), and the like. Examples of the resin include fluorine-based resin, PPS (polyphenylene sulfide), polyamide-based PEEK (polyether ether ketone), and the like as thermoplastic resin, as well as phenol-based resin, melamine-based resin and the like as thermosetting resin. Examples of the fiber include polyamide-based fiber, polyimide-based fiber, glass-based fiber, ceramic-based fiber, and the like.

Here, the material for fixing member 13 is required to have (1) strength to withstand external impact, (2) insulating property, and (3) heat resistance. This is because a material not having strength to some extent cannot basically fix the anode terminal and the cathode terminal, a non-insulating material may lead to leakage, for example, due to adhesion of a solid electrolyte or the like to fixing member 13, and a material without heat resistance cannot withstand thermal stress during heat treatment or the like.

From the foregoing, the material for fixing member 13 in the present embodiment is preferably a material mixture of resin and fiber or a material mixture of resin and glass. This is because the material mixture achieves improved heat resistance or because deformation such as expansion and shrinkage of the material due to heating is less likely. In the present embodiment, a particularly preferred composite material is a material mixture of fluorine-based resin and fiber.

<<Material for Other Members>>

A material obtained by subjecting a valve metal such as aluminum, tantalum and niobium to etching process and chemical conversion treatment may be used for anode foil 2. Moreover, a known material can be selected as appropriate for use for cathode foil 3 and separator paper 4.

The electrolytic capacitor in the present embodiment may employ a solid electrolyte or a liquid electrolyte as the electrolyte. An electron-conductive solid or a conductive polymer is employed as the solid electrolyte. Examples of the electron-conductive solid include manganese dioxide and 7,7,8,8-tetracyanoquinodimethane (TCNQ) complex salt, and examples of the conductive polymer include polypyrrole, polythiophene, polyfuran, polyaniline, and the like. In addition, examples of the liquid electrolyte include a solution obtained by dissolving 5 to 100 parts of quaternary salt of a compound having an alkyl-substituted amidine group of phthalic acid and/or maleic acid as the electrolyte in 100 parts of an organic solvent containing, for example, γ-butyrolactone. In the present embodiment, the electrolytic capacitor including the solid electrolyte is particularly preferred.

In addition, for example, epoxy resin, butyl rubber having low permeability and high heat resistance, or the like may be used for sealing member 10.

<Method of Manufacturing Electrolytic Capacitor>

Outlines of the method of manufacturing the electrolytic capacitor according to the present embodiment will be described with reference to FIGS. 1 and 2.

The electrolytic capacitor of the present embodiment includes at least a first step and a second step. In the first step, the wound-type capacitor element including winding structure portion 1 formed by winding anode foil 2 and cathode foil 3 with separator paper 4 being interposed therebetween and the anode terminal and the cathode terminal drawn from winding structure portion 1 is formed. In addition, in the second step, the anode terminal and the cathode terminal are inserted in openings in fixing member 13 having openings in number equal to or greater than the sum of the number of anode terminals and the number of cathode terminals. In the following, description will be given separately for the first step and the second step.

<<First Step>>

Initially, anode foil 2 subjected to etching process, chemical conversion treatment and the like with a known method is prepared. Then, anode lead 7 is attached to anode foil 2 through lead tab terminal 6. Thereafter, cathode lead 8 is attached to cathode foil 3 through lead tab terminal 6. Then, anode foil 2 and cathode foil 3 are wound up with separator paper 4 being interposed therebetween and taped with a stop tape 5. Through the steps above, the wound-type capacitor element including winding structure portion 1 formed of a wound-type layered structure and the anode terminal consisting of lead tab terminal 6 and, anode lead 7 and the cathode terminal consisting of lead tab terminal 6 and cathode lead 8 is formed.

<<Second Step>>

Then, fixing member 13 having openings is prepared and the anode terminal and the cathode terminal in the wound-type capacitor element manufactured in the first step are inserted in the openings. Here, adjustment can be made as appropriate such that the anode terminal and the cathode terminal are fixed at desired positions by fixing member 13.

<<Electrolyte Filling Step>>

Thereafter, winding structure portion 1 is subjected to chemical conversion treatment of a cut section and heat treatment at a temperature from 150° C. to 300° C. Then, winding structure portion 1 is impregnated with a solution mixture (polymerization liquid) of a monomer forming a conductive polymer through polymerization and an oxidizing agent solution such as a ferric p-toluenesulfonate alcohol solution. Thereafter, through thermochemical polymerization, a conductive polymer layer serving as a solid electrolyte can be formed between anode foil 2 and cathode foil 3 of winding structure portion 1.

<<Finishing Step>>

Then, the wound-type capacitor element including the solid electrolyte is accommodated in bottomed case 9 made of aluminum. Here, though the wound-type capacitor element is preferably accommodated in bottomed case 9 with fixing member 13 remaining placed, fixing member 13 may be removed as appropriate. Then, sealing member 10 for sealing winding structure portion 1 within bottomed case 9 is placed in the opening of bottomed case 9. Here, in the present embodiment, as the positions of the anode terminal and the cathode terminal are fixed by fixing member 13, displacement of the position is less likely in placing (inserting) sealing member 10. Thereafter, sealing is carried out by performing pressing in a lateral direction and curling in the opening of bottomed case 9, and aging treatment is performed.

Finally, seat plate 11 made of plastic is provided on a curled surface around the opening of bottomed case 9 and anode lead 7 and cathode lead 8 are pressed and bent as electrode terminals 12, to complete the electrolytic capacitor.

Though the electrolytic capacitor in the present invention includes the solid electrolyte, a liquid electrolyte may be employed.

The present invention will be described hereinafter in further detail with reference to examples, however, the present invention is not limited as such.

Example 1

Description will be given with reference to FIGS. 1 and 2.

<<First Step>>

Initially, anode foil 2 subjected to etching process, chemical conversion treatment and the like with a known method was prepared. Then, two anode leads 7 were attached to anode foil 2 through lead tab terminal 6. Thereafter, two cathode leads 8 were attached to cathode foil 3 through lead tab terminal 6. Then, anode foil 2 and cathode foil 3 were wound up with separator paper 4 being interposed therebetween and taped with stop tape 5.

<<Second Step>>

Then, fixing member 13 having four openings and a thickness of 1.0 mm was prepared and the anode terminal and the cathode terminal in the wound-type capacitor element manufactured in the first step were inserted in the openings. Here, adjustment was made as appropriate such that the anode terminal and the cathode terminal are fixed at desired positions by fixing member 13.

<<Electrolyte Filling Step>>

Thereafter, winding structure portion 1 was subjected to chemical conversion treatment of a cut section and heat treatment at a temperature from 150° C. to 300° C. Then, winding structure portion 1 was impregnated with a solution mixture of a monomer forming a conductive polymer through polymerization and a ferric p-toluenesulfonate alcohol solution representing an oxidizing agent solution. Thereafter, through thermochemical polymerization, a conductive polymer layer serving as a solid electrolyte was formed between anode foil 2 and cathode foil 3 of winding structure portion 1.

<<Finishing Step>>

Then, the wound-type capacitor element including the solid electrolyte was accommodated in bottomed case 9 made of aluminum. Then, sealing member 10 for sealing winding structure portion 1 within bottomed case 9 was placed in the opening of bottomed case 9. Attention was paid such that fixing member 13 formed of butyl rubber is arranged between winding structure portion 1 and sealing member 10. Thereafter, sealing was carried out by performing pressing in a lateral direction and curling in the opening of bottomed case 9, and aging treatment was performed.

Finally, seat plate 11 made of plastic was provided on a curled surface around the opening of bottomed case 9 and anode lead 7 and cathode lead 8 were pressed and bent as electrode terminals 12, to complete the electrolytic capacitor.

Example 2

In the present example, the electrolytic capacitor was manufactured as in Example 1 except for using fixing member 13 formed of fluororesin.

Example 3

In the present example, the electrolytic capacitor was manufactured as in Example 1 except for using fixing member 13 formed of aramid fiber.

Example 4

In the present example, the electrolytic capacitor was manufactured as in Example 1 except for using fixing member 13 formed of a material mixture of fluororesin and aramid fiber.

Example 5

In the present example, the electrolytic capacitor was manufactured as in Example 1 except for using fixing member 13 formed of a material mixture of fluororesin and glass.

Comparative Example

The electrolytic capacitor was manufactured as in Example 1 except for not placing fixing member 13 in the second step in Example 1.

Table 1 shows a ratio of occurrence of defects, Cap (capacitance), tan δ (dielectric loss tangent), ESR (equivalent series resistance), and LC (leakage current) of the electrolytic capacitors according to Example 1 to Example 5 and Comparative Example described above.

TABLE 1

|  | Fixing Member | | Number of | | | | |
| --- | --- | --- | --- | --- | --- | --- | --- |
|  | Provided/ Not Provided | Material | Occurrences of Defects | Cap. (μF) | tan δ (%) | ESR (mΩ) | LC (μA) |
| Example 1 | Provided | Rubber-based | 0/500 | 2350 | 3.5 | 2.71 | 22 |
| Example 2 | Provided | Resin-based | 0/500 | 2365 | 3.6 | 2.62 | 24 |
| Example 3 | Provided | Fiber-based | 0/500 | 2340 | 3.3 | 2.66 | 21 |
| Example 4 | Provided | Resin + Fiber | 0/500 | 2390 | 3.7 | 2.63 | 19 |
| Example 5 | Provided | Resin + Glass | 0/500 | 2350 | 3.6 | 2.56 | 18 |
| Comparative Example | Not Provided | — | 27/500 | 2345 | 3.5 | 2.78 | 146 |

It is noted that the capacitance and the dielectric loss tangent were measured at 120 Hz, the equivalent series resistance was measured at 100 kHz, and the leakage current indicates a value obtained when a rated voltage was applied for two minutes. These values were measured by using 4284A manufactured by Agilent. In addition, unsuccessful insertion of the sealing member was counted as the number of occurrences of defects.

Based on the results in Table 1, the electrolytic capacitors according to Example 1 to Example 5 were free from occurrence of defects, whereas in Comparative Example, 27 defective products were found among 500 samples. In addition, it was found that the electrolytic capacitors according to Example 1 to Example 5 successfully prevented increase in the leakage current. In particular, the value of the leakage current was small in Example 4 and Example 5, and it was considered that, when fixing member 13 is formed of a composite material of resin and fiber or a composite material of resin and glass, heat resistance was particularly improved and deformation such as expansion and shrinkage of fixing member 13 due to heating or the like was not likely.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing an electrolytic capacitor, comprising the ordered steps of:
    a first step of forming a wound-type capacitor element including a winding structure portion formed by winding an anode foil and a cathode foil with a separator being interposed and an anode terminal and a cathode terminal drawn from said winding structure portion; then
    a second step of inserting said anode terminal and said cathode terminal in openings in a fixing member, said fixing member having openings in number not smaller than a sum of number of said anode terminals and number of said cathode terminals; then
    a third step of impregnating said wound-type capacitor element with an electrolyte solution or a solid electrolyte; and then
    a fourth step of inserting said anode terminal and said cathode terminal in penetrating holes in a sealing member and accommodating said wound-type capacitor element in a bottomed case.

2. The method of manufacturing the electrolytic capacitor according to claim 1, wherein the sum of the number of said anode terminals and the number of said cathode terminals is three or greater.

3. The method of manufacturing the electrolytic capacitor according to claim 1, wherein said fixing member is made of an insulating material.

4. The method of manufacturing the electrolytic capacitor according to claim 2, wherein said fixing member is made of an insulating material.

5. The method of manufacturing the electrolytic capacitor according to claim 3, wherein said insulating material is made of at least one selected from rubber, resin, fiber, and glass.

6. The method of manufacturing the electrolytic capacitor according to claim 4, wherein said insulating material is made of at least one selected from rubber, resin, fiber, and glass.

7. The method of manufacturing the electrolytic capacitor according to claim 1, wherein said fixing member has a thickness of 50% to 95% of a distance between an upper surface of said winding structure portion and a lower surface of said sealing member.

8. The method of manufacturing the electrolytic capacitor according to claim 2, wherein said fixing member has a thickness of 50% to 95% of a distance between an upper surface of said winding structure portion and a lower surface of said sealing member.

* * * * *